United States Patent
Miyauchi et al.

(10) Patent No.: US 10,899,361 B2
(45) Date of Patent: Jan. 26, 2021

(54) MOVING OBJECT CONTROLLING DEVICE, MOVING OBJECT CONTROLLING METHOD, AND COMPUTER READABLE MEDIUM

(71) Applicant: Mitsubishi Electric Corporation, Tokyo (JP)

(72) Inventors: Nobuhito Miyauchi, Tokyo (JP); Ryo Okabe, Tokyo (JP); Tomohiko Higashiyama, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 116 days.

(21) Appl. No.: 16/303,069

(22) PCT Filed: Jun. 2, 2016

(86) PCT No.: PCT/JP2016/066354
§ 371 (c)(1),
(2) Date: Nov. 19, 2018

(87) PCT Pub. No.: WO2017/208416
PCT Pub. Date: Dec. 7, 2017

(65) Prior Publication Data
US 2019/0300010 A1    Oct. 3, 2019

(51) Int. Cl.
*B60W 50/035*      (2012.01)
*B60W 50/14*       (2020.01)
(Continued)

(52) U.S. Cl.
CPC .......... *B60W 50/035* (2013.01); *B60W 50/14* (2013.01); *G05D 1/0088* (2013.01); *B60W 2050/0026* (2013.01); *B60W 2555/60* (2020.02)

(58) Field of Classification Search
CPC ..... B60W 2050/0026; B60W 2555/60; B60W 50/035; B60W 50/14; G05D 1/0088
See application file for complete search history.

(56) References Cited

U.S. PATENT DOCUMENTS 9,841,286 B1 * 12/2017 Hayward ............... G07C 5/008
2002/0183911 A1 * 12/2002 Tashiro ............... B60W 50/029
                                                         701/48
(Continued)

FOREIGN PATENT DOCUMENTS

JP       5-270428 A    10/1993
JP      11-180182 A     7/1999
(Continued)

OTHER PUBLICATIONS

"Research and Development on Automatic Driving/Platooning Technology", Japan Automobile Research Institute (JARI), et al, Total No. pp. 72.
(Continued)

*Primary Examiner* — Babar Sarwar
(74) *Attorney, Agent, or Firm* — Birch, Stewart, Kolasch & Birch, LLP

(57) ABSTRACT

A moving object controlling device (10) determines, when malfunction of an instrument such as a processor (11) mounted in a moving object (100) is specified, control contents with respect to the moving object (100) according to malfunction contents such as a level of the specified malfunction and a peripheral situation of the moving object (100) such as a movement place of the moving object (100) and a movement environment that influences movement of the moving object (100). Then, the moving object controlling device (10) controls the moving object (100) according to the determined control contents.

8 Claims, 11 Drawing Sheets

(51) Int. Cl.
  *G05D 1/00* (2006.01)
  *B60W 50/00* (2006.01)

(56) References Cited

U.S. PATENT DOCUMENTS

| | | | | |
|---|---|---|---|---|
| 2004/0162650 | A1* | 8/2004 | Kueperkoch | B60G 17/0185 701/29.2 |
| 2005/0080542 | A1* | 4/2005 | Lu | B60T 8/172 701/70 |
| 2006/0015231 | A1* | 1/2006 | Yoshimura | B60W 10/04 701/48 |
| 2008/0059018 | A1* | 3/2008 | Kueperkoch | B60G 17/0185 701/30.3 |
| 2010/0030421 | A1* | 2/2010 | Yoshimura | B60W 10/18 701/31.4 |
| 2010/0256903 | A1* | 10/2010 | Johnson | G01C 21/3415 701/533 |
| 2010/0286864 | A1* | 11/2010 | Kawauchi | G08G 1/163 701/31.4 |
| 2013/0253756 | A1* | 9/2013 | Matsuno | B60W 50/035 701/29.2 |
| 2014/0176321 | A1* | 6/2014 | Chen | B60W 30/14 340/435 |
| 2014/0188343 | A1* | 7/2014 | Yoshimura | B60W 10/06 701/41 |
| 2014/0278047 | A1* | 9/2014 | Bahl | G08G 1/167 701/301 |
| 2014/0306826 | A1* | 10/2014 | Ricci | G06F 9/451 340/573.1 |
| 2015/0100207 | A1* | 4/2015 | Yoshimura | B60K 6/52 701/41 |
| 2015/0360664 | A1* | 12/2015 | Svensson | B60T 13/662 701/70 |
| 2019/0056498 | A1* | 2/2019 | Sonn | G01S 17/89 |

FOREIGN PATENT DOCUMENTS

| | | |
|---|---|---|
| JP | 2004-124841 A | 4/2004 |
| JP | 2004-249980 A | 9/2004 |
| JP | 2006-7892 A | 1/2006 |
| JP | 2007-203883 A | 8/2007 |
| JP | 2012-220286 A | 11/2012 |
| JP | 2013-193612 A | 9/2013 |
| JP | 2014-208527 A | 11/2014 |

OTHER PUBLICATIONS

Aoki, "Development Trend of Automatic Driving Technology and Issues for Practical Application", Information Processing Society of Japan (IPSJ), Special Interest Group on Computer Architecture, Mar. 7, 2014, Total No. pp. 39.

Aoki, "Development Trend of Automatic Driving Technology and Issues for Practical Application", Institute of Systems, Information Technologies and Nanotechnologies (ISIT), The 14th Special interest Group on Car Electronics, Jan. 24, 2014, Total No. pp. 41.

International Search Report issued in PCT/JP2016/066354 (PCT/ISA/210), dated Aug. 9, 2016.

\* cited by examiner

Fig. 5

| MALFUNCTION LEVEL | CONTROL CONTENTS | | |
|---|---|---|---|
| | PERIPHERAL SITUATION | HANDLING CONTENTS | MULTIPLEX SYSTEM CONTROL |
| LOW 1 TRANSIENT ERROR | ALL SITUATION | CONTINUE CONVENTIONAL PROCESSING | KEEP MULTIPLEX SYSTEM |
| LOW 2 RESTORATION PROCESSING IS POSSIBLE | FREEWAY, SUBURB | CONTINUE CONVENTIONAL PROCESSING AFTER RESTORATION PROCESSING | KEEP MULTIPLEX SYSTEM |
| | GENERAL ROAD, ENTRANCE/EXIT OF FREEWAY, TRAFFIC JAM | PULL OVER TO ROAD SHOULDER (FAIL OPERATION) | KEEP MULTIPLEX SYSTEM |
| MIDDLE 1 MALFUNCTION OF ONE SYSTEM | FREEWAY, ENTRANCE/EXIT OF FREEWAY, SUBURB | MOVE TO GARAGE (FAIL OPERATION) | STOP MALFUNCTIONED SYSTEM |
| | GENERAL ROAD, TRAFFIC JAM | PULL OVER TO ROAD SHOULDER (FAIL OPERATION) | STOP MALFUNCTIONED SYSTEM |
| MIDDLE 2 REBOOT IS NECESSARY | SUBURB | CONTINUE CONVENTIONAL PROCESSING AFTER REBOOT | KEEP MULTIPLEX SYSTEM |
| | GENERAL ROAD, FREEWAY, ENTRANCE/EXIT OF FREEWAY, TRAFFIC JAM | MOVE TO GARAGE (FAIL OPERATION) | KEEP MULTIPLEX SYSTEM |
| HIGH RESTORATION IS NOT POSSIBLE | ALL SITUATION | SWITCH TO MANUAL DRIVING | STOP ALL SYSTEM |

Fig. 8

| MALFUNCTION LEVEL | PERIPHERAL SITUATION | HANDLING CONTENTS | MULTIPLEX SYSTEM CONTROL | NOTIFICATION METHOD |
|---|---|---|---|---|
| LOW 1: TRANSIENT ERROR | ALL SITUATION | CONTINUE CONVENTIONAL PROCESSING | KEEP MULTIPLEX SYSTEM | NOTIFICATION OF LOW LEVEL |
| LOW 2: RESTORATION PROCESSING IS POSSIBLE | FREEWAY, SUBURB | CONTINUE CONVENTIONAL PROCESSING AFTER RESTORATION PROCESSING | KEEP MULTIPLEX SYSTEM | NOTIFICATION OF LOW LEVEL |
| LOW 2: RESTORATION PROCESSING IS POSSIBLE | GENERAL ROAD, ENTRANCE/EXIT OF FREEWAY, TRAFFIC JAM | PULL OVER TO ROAD SHOULDER (FAIL OPERATION) | KEEP MULTIPLEX SYSTEM | NOTIFICATION OF MIDDLE LEVEL |
| MIDDLE 1: MALFUNCTION OF ONE SYSTEM | FREEWAY, ENTRANCE/EXIT OF FREEWAY, SUBURB | MOVE TO GARAGE (FAIL OPERATION) | STOP MALFUNCTIONED SYSTEM | NOTIFICATION OF MIDDLE LEVEL |
| MIDDLE 1: MALFUNCTION OF ONE SYSTEM | GENERAL ROAD, TRAFFIC JAM | PULL OVER TO ROAD SHOULDER (FAIL OPERATION) | STOP MALFUNCTIONED SYSTEM | NOTIFICATION OF HIGH LEVEL |
| MIDDLE 2: REBOOT IS NECESSARY | SUBURB | CONTINUE CONVENTIONAL PROCESSING AFTER REBOOT | KEEP MULTIPLEX SYSTEM | NOTIFICATION OF LOW LEVEL |
| MIDDLE 2: REBOOT IS NECESSARY | GENERAL ROAD, FREEWAY, TRAFFIC JAM | MOVE TO GARAGE (FAIL OPERATION) | KEEP MULTIPLEX SYSTEM | NOTIFICATION OF MIDDLE LEVEL |
| HIGH: RESTORATION IS NOT POSSIBLE | ALL SITUATION | SWITCH TO MANUAL DRIVING | STOP ALL SYSTEM | NOTIFICATION OF HIGH LEVEL |

Fig. 10

TABLE OF CLASSIFICATION 1 OF
MALFUNCTION CONTENTS AND MOVEMENT ENVIRONMENT

| TRAVELING PLACE | CONTROL CONTENTS | |
|---|---|---|
| | HANDLING CONTENTS | MULTIPLEX SYSTEM CONTROL |
| FREEWAY, CRUISING LANE | CONTINUE CONVENTIONAL PROCESSING AFTER RESTORATION PROCESSING | KEEP MULTIPLEX SYSTEM |
| FREEWAY, PASSING LANE | CONTINUE CONVENTIONAL PROCESSING AFTER RESTORATION PROCESSING | KEEP MULTIPLEX SYSTEM |
| FREEWAY, ENTRANCE LANE | PULL OVER TO ROAD SHOULDER (FAIL OPERATION) | KEEP MULTIPLEX SYSTEM |
| ENTRANCE/EXIT OF FREEWAY | PULL OVER TO ROAD SHOULDER (FAIL OPERATION) | KEEP MULTIPLEX SYSTEM |
| GENERAL ROAD, URBAN AREA | PULL OVER TO ROAD SHOULDER (FAIL OPERATION) | KEEP MULTIPLEX SYSTEM |
| GENERAL ROAD, SUBURB | MOVE TO GARAGE (FAIL OPERATION) | KEEP MULTIPLEX SYSTEM |
| ... | ... | ... |

MOVING OBJECT CONTROLLING DEVICE, MOVING OBJECT CONTROLLING METHOD, AND COMPUTER READABLE MEDIUM

TECHNICAL FIELD

This invention relates to control of a case where malfunction occurs in an instrument mounted in a moving object.

BACKGROUND ART

In an advanced driver-assistance system such as an automated driving system, safety of a design is emphasized in terms of prevention of an accident.

Specifically, similarly to a space rocket and an airplane, a mechanism of a multiplex system is employed in mounting of an electronic control device, which is a center of control processing of an advanced driver-assistance system, in order to prevent a loss of control even when hardware malfunction of a part occurs. Even when one system in a multiplex system malfunctions, the electronic control device can continue execution processing as long as a remaining system can operate normally.

This electronic control device is called an advanced drive assistance system electronic control unit (ADAS ECU).

In Patent Literature 1, it is described that a limit target value is limited in a case where malfunction occurs in an actuator that controls a vehicle. As a detailed example, it is described that a maximum speed is limited to a range that can be controlled by a brake device operating normally in a case where malfunction occurs in a brake device.

CITATION LIST

Patent Literature

Patent Literature 1: JP 11-180182 A

SUMMARY OF INVENTION

Technical Problem

Appropriate control of a case where malfunction occurs in an instrument is not always the same. That is, appropriate control in a certain situation may not be appropriate in a different situation.

This invention is to realize appropriate control of a case where malfunction occurs in an instrument.

Solution to Problem

A moving object controlling device according to the present invention includes:

a malfunction handling unit to determine, when malfunction of an instrument mounted in a moving object is specified, control contents with respect to the moving object according to malfunction contents of the specified malfunction and a peripheral situation of the moving object; and a control unit to control the moving object according to the control contents determined by the malfunction handling unit.

Advantageous Effects of Invention

In this invention, control contents are determined according to malfunction contents and a peripheral situation of a moving object. Thus, it is possible to realize appropriate control of a case where malfunction occurs in an instrument.

BRIEF DESCRIPTION OF DRAWINGS

FIG. 5 is a table illustrating the malfunction handling processing according to the first embodiment.

FIG. 8 is a table illustrating malfunction handling processing according to a third modification example.

FIG. 10 is a view for describing a malfunction handling table 42 according to the second embodiment.

DESCRIPTION OF EMBODIMENTS

First Embodiment

Description of Configuration

Figure 1:
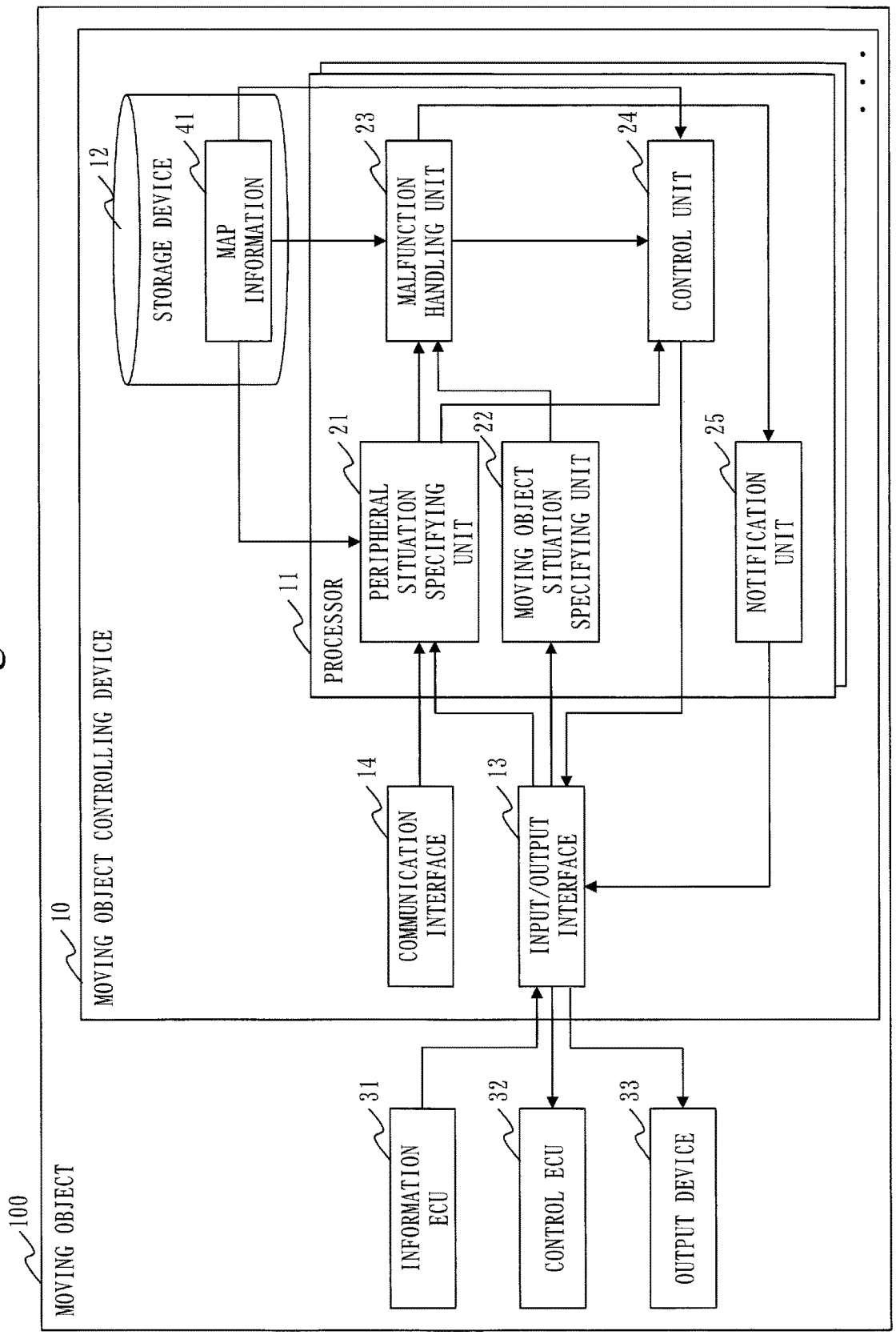
FIG. 1 is a configuration view of a moving object controlling device 10 according to a first embodiment.

A configuration of a moving object controlling device 10 according to the first embodiment will be described with reference to FIG. 1.

The moving object controlling device 10 is a computer that includes a microprocessor board or the like and that is mounted in a moving object 100. The moving object 100 is a vehicle in the first embodiment.

The moving object controlling device 10 may be mounted in an integrated form or an un-separable form or mounted in a detachable form or a separable form with respect to the moving object 100 or a different illustrated configuration element.

The moving object controlling device 10 includes hardware that is a plurality of processors 11, a storage device 12, an input/output interface 13, and a communication interface 14. Each of the processors 11 is connected to the other hardware through a signal line and controls the other hardware.

Each of the processors 11 is an integrated circuit (IC) that performs processing. Detailed examples of each of the processors 11 include a central processing unit (CPU), a digital signal processor (DSP), and a graphics processing unit.

Detailed examples of the storage device 12 include a random access memory (RAM) and a hard disk drive (HDD). Also, the storage device 12 may be a portable storage medium such as a secure digital (SD) memory card, a CompactFlash (CF), a NAND flash, a flexible disk, an optical disk, a compact disc, a Blu-ray (registered trademark) disc, or a DVD.

The input/output interface 13 is a device that connects an information electronic control unit (ECU) 31, a control ECU 32, an output device 33, and the like mounted in the moving object 100. Detailed examples of the input/output interface 13 include connection terminals of a universal serial bus (USB), a high-definition multimedia interface (HDMI, registered trademark), and a controller area network (CAN).

The information ECU 31 is a device that acquires detection information detected by a sensor such as a millimeter-wave radar, a camera, an infrared radar, an ultrasonic sensor, or a GPS sensor mounted in the moving object 100. Also, the information ECU 31 is a device that acquires instrument information output from an instrument such as an accelerator, steering, or a brake mounted in the moving object 100. The instrument information indicates a state of an instrument of an output source. The state of an instrument includes presence/absence of malfunction of the instrument and malfunction contents.

The control ECU 32 is a device that controls an instrument such as an accelerator, steering, or a brake mounted in the moving object.

The output device 33 is a device to output information and is, for example, a display, a speaker, or a light source.

The communication interface 14 is a device to communicate with an external device such as a road-side machine provided on a road side. A detailed example of the communication interface 14 is a network interface card (NIC).

The road-side machine delivers traffic information indicating a state of a traffic light, a road surface state, a different moving object in a periphery, and the like.

The moving object controlling device 10 includes, as functional configurations, a peripheral situation specifying unit 21, a moving object situation specifying unit 22, a malfunction handling unit 23, a control unit 24, and a notification unit 25. A function of each of the peripheral situation specifying unit 21, the moving object situation specifying unit 22, the malfunction handling unit 23, the control unit 24, and the notification unit 25 is realized by software.

A program to realize a function of each unit of the moving object controlling device 10 is stored in the storage device 12. This program is loaded by the plurality of processors 11 and executed by the plurality of processors 11. Thus, a function of each unit of the moving object controlling device 10 is realized. Also, map information 41 is stored in the storage device 12. The map information 41 indicates information such as a road, a type of a road, a lane, and a type of a lane.

The plurality of processors 11 shares execution of a program to realize a function of each unit of the moving object controlling device 10. A function of each unit can be realized even with one of the plurality of processors 11. That is, the plurality of processors 11 has a multiplexed configuration.

Information, data, a signal value, and a variable value indicating a result of processing of a function of each unit which function is realized by the plurality of processors 11 are stored in the storage device 12, or a register or a cache memory in the plurality of processors 11. In the following description, the description is made on the assumption that the information, data, signal value, and variable value indicating a result of processing of a function of each unit which function is realized by the plurality of processors 11 are stored in the storage device 12.

It is assumed that a program to realize each function relied by the plurality of processors 11 is stored in the storage device 12. However, this program may be stored in a portable storage medium such as a magnetic disk, a flexible disk, an optical disk, a compact disc, a Blu-ray (registered trademark) disc, or a DVD.

Description of Operation

An operation of the moving object controlling device 10 according to the first embodiment will be described with reference to FIG. 2 to FIG. 6.

The operation of the moving object controlling device 10 according to the first embodiment corresponds to a moving object controlling method according to the first embodiment. Also, the operation of the moving object controlling device 10 according to the first embodiment corresponds to processing of a moving object controlling program according to the first embodiment.

Figure 2:
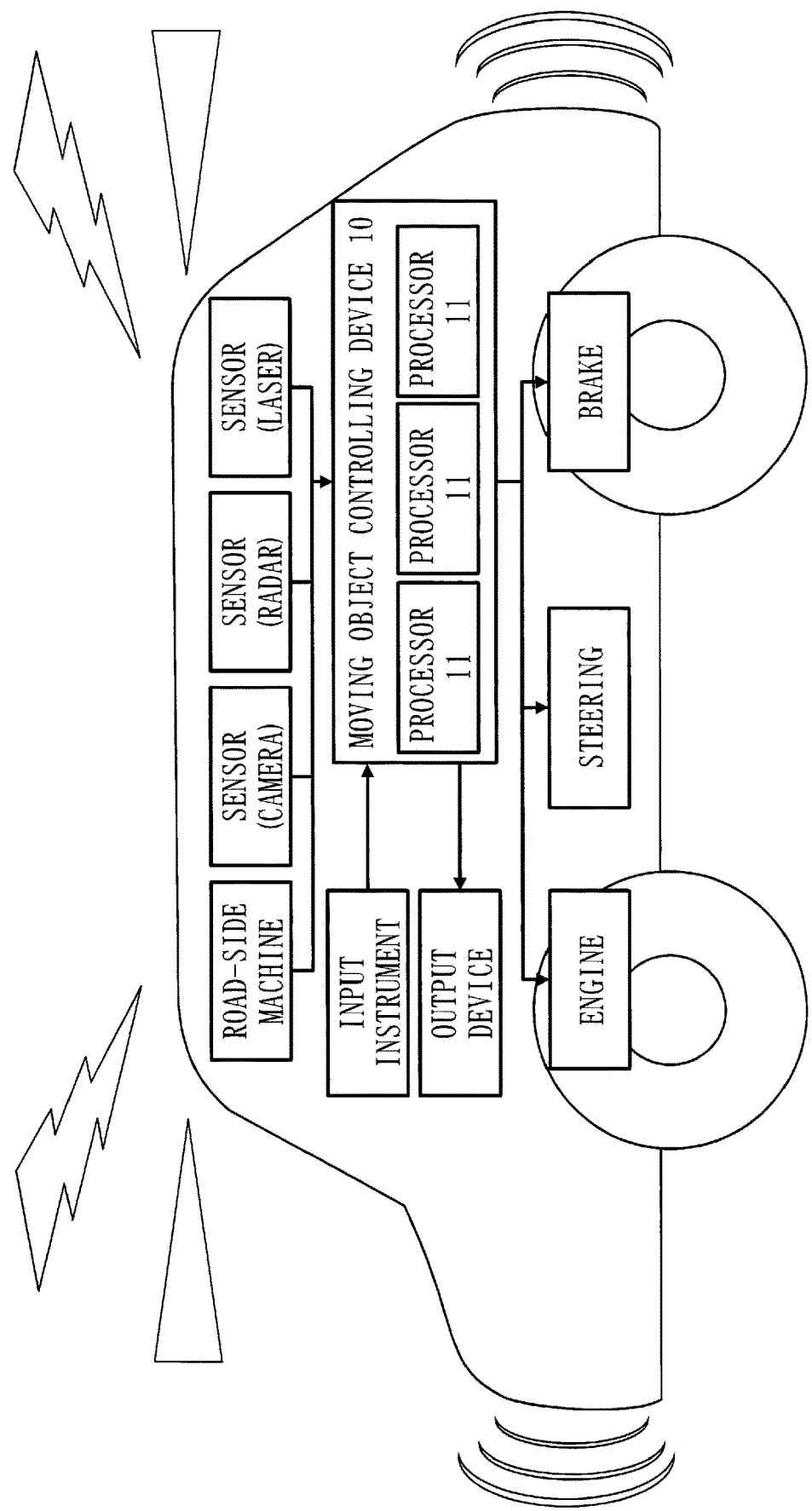
FIG. 2 is a view for describing an operation outline of the moving object controlling device 10 according to the first embodiment.

An operation outline of the moving object controlling device 10 according to the first embodiment will be described with reference to FIG. 2.

In the moving object 100, automated driving control of instruments such as an engine, steering, and a brake is performed on the basis of information acquired from various sensors and a road-side machine. There is a case where a sensor or an instrument mounted in the moving object 100, or hardware such as the processors 11 included in the moving object controlling device 10 malfunctions in a movement. In this case, the moving object 100 is controlled by the moving object controlling device 10 according to malfunction contents and a peripheral situation of the moving object 100. Here, a malfunction part and malfunction contents are notified to a driver through an output device.

In the moving object 100, the automated driving control can be switched to manual driving control performed by operation of manual input instruments such as an accelerator pedal, a steering wheel, or a brake pedal by a driver.

In the first embodiment, path information indicating a movement path of the moving object 100 is generated according to malfunction contents and a peripheral situation of the moving object 100, and the moving object 100 is controlled according to the generated path information. Note that it is assumed that the moving object 100 is controlled according to path information previously set by a driver or the like in a case where there is no malfunction.

Overall processing by the moving object controlling device 10 according to the first embodiment will be described with reference to FIG. 3.

Figure 3:
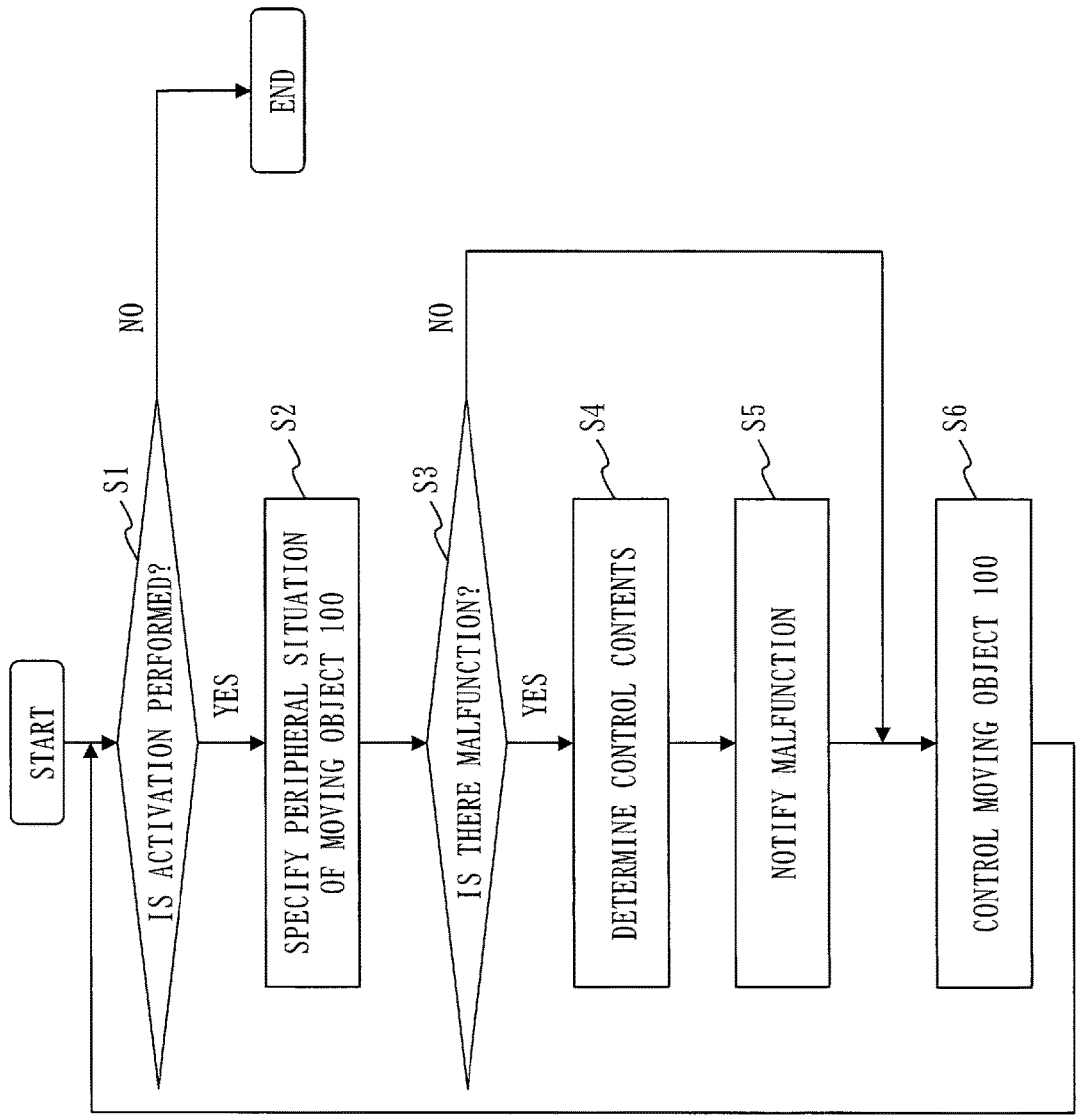
FIG. 3 is a flowchart of overall processing of the moving object controlling device 10 according to the first embodiment.

The processing illustrated in FIG. 3 is started in activation of the moving object 100 and is continued as long as the moving object 100 is in an activated state, that is, until the moving object 100 is stopped. Here, a detailed example of the activation is a case where an engine of the moving object 100 is driven or a case where a power of a motor of the moving object 100 is turned on. Also, here, the stop is a case where the engine of the moving object 100 is turned off or a case where the power of the motor of the moving object 100 is turned off.

(Step S1: Activation Determination Processing)

The control unit 24 determines whether the moving object 100 is in an activated state. More specifically, the control unit 24 determines whether an engine is driven or whether a power of a motor is in an on-state.

The control unit 24 advances the processing to step S2 in a case where the moving object 100 is in the activated state, and ends the processing in a case where the moving object 100 is not in the activated state.

(Step S2: Peripheral Situation Specifying Processing)

The peripheral situation specifying unit 21 acquires detection information, which is detected by various sensors, from the information ECU 31 through the input/output interface 13. Also, the peripheral situation specifying unit 21 acquires, through the communication interface 14, traffic information delivered from the road-side machine. Also, the peripheral situation specifying unit 21 reads map information 41 from the storage device 12. Then, the peripheral situation specifying unit 21 specifies a peripheral situation of the moving object 100 from the acquired detection information, traffic information, and map information 41.

In the first embodiment, the peripheral situation indicates a movement place of the moving object 100 which place indicates a road where the moving object 100 travels and a type of an area where the moving object 100 travels. The road where the moving object 100 travels indicates a type of a road such as a freeway or a general road. Moreover, the road where the moving object 100 travels may indicate a cruising lane, a passing lane, an entrance lane, an exit lane, an entrance/exit, or a tollbooth in a case where a type of a road is a freeway. Also, the road where the moving object 100 travels may indicate a cruising lane, a passing lane, a left-turn lane, a right-turn lane, an intersection, a railroad crossing, or a blind curve in a case where a type of a road is a general road. The type of an area where the moving object 100 travels indicates a classification such as an urban area, a downtown, a residential area, or a suburb.

(Step S3: Moving Object Situation Specifying Processing)

The moving object situation specifying unit 22 acquires instrument information, which is output from various instruments, from the information ECU 31 through the input/output interface 13. The moving object situation specifying unit 22 specifies a newly malfunctioned instrument from the acquired instrument information. Also, the moving object situation specifying unit 22 specifies malfunction contents from the acquired instrument information in a case where there is a newly malfunctioned instrument.

The moving object situation specifying unit 22 advances the processing to step S4 in a case where there is a newly malfunctioned instrument, and advances the processing to step S6 in a case where there is no newly malfunctioned instrument.

(Step S4: Malfunction Handling Processing)

When a malfunction of an instrument mounted in the moving object 100 is specified in step S3, the malfunction handling unit 23 determines control contents with respect to the moving object 100 according to the malfunction contents specified in step S3 and the peripheral situation of the moving object 100 which situation is specified in step S2. In the first embodiment, the malfunction handling unit 23 generates path information, which indicates a movement path of the moving object 100, as the control contents according to the malfunction contents and the peripheral situation.

(Step S5: Notification Processing)

The notification unit 25 outputs notification information indicating the malfunctioned instrument and the malfunction contents to the output device 33 through the input/output interface 13. Thus, the malfunctioned instrument and the malfunction contents are notified to a driver.

(Step S6: Moving Object Controlling Processing)

In a case where there is no malfunctioned instrument, the control unit 24 controls the moving object 100 according to previously set path information. On the other hand, in a case where there is a malfunctioned instrument, the control unit 24 controls the moving object 100 according to the path information generated in step S4.

More specifically, according to the path information, the control unit 24 outputs operation information indicating operation contents of movement of the moving object 100 to the control ECU 32 through the input/output interface 13. Then, the control ECU 32 controls instruments such as an accelerator, steering, and a brake according to the output operation information and moves the moving object 100 according to the path information.

The malfunction handling processing (step S4 in FIG. 3) according to the first embodiment will be described with reference to FIG. 4 and FIG. 5.

(Step S401: Malfunction Level Determination Processing)

The malfunction handling unit 23 determines an occurring malfunction level from the malfunction contents specified in step S3.

In the first embodiment, the malfunction handling unit 23 specifies to which of five malfunction levels the occurring malfunction corresponds, the five levels being Low 1: a transient error, Low 2: restoration processing is possible, Middle 1: malfunction of one system (fail operation is possible), Middle 2: reboot is necessary, and High: restoration is not possible. The malfunction handling unit 23 advances the processing to step S402 in a case where the malfunction level is Low 1: a transient error. The malfunction handling unit 23 advances the processing to step S403 in a case where the malfunction level is Low 2: restoration processing is possible. The malfunction handling unit 23 advances the processing to step S404 in a case where the malfunction level is Middle 1: malfunction of one system (fail operation is possible). The malfunction handling unit 23 advances the processing to step S405 in a case where the malfunction level is Middle 2: reboot is necessary. The malfunction handling unit 23 advances the processing to step S406 in a case where the malfunction level is High: restoration is not possible.

More specifically, the malfunction handling unit 23 previously defines a malfunction level for each of malfunction contents and determines an occurring malfunction level according to the definition.

Also, the malfunction handling unit 23 may execute a diagnosis test and determine a malfunction level. Detailed examples of the diagnosis test include a diagnosis program of LSI, a fundamental test of network communication between in-vehicle devices, an operation confirmation test of a restoration program of software of network communication between in-vehicle devices, and a minimum operation test of software that controls an engine, steering, and a brake. Here, the malfunction handling unit 23 may determine a diagnosis test to be executed according to a peripheral situation. This is because processing time and the like varies depending on a diagnosis test. For example, a diagnosis test that takes time may be executed in a case where stable traveling is continued for a while such as a case of traveling in a freeway with a few traveling vehicles, and a diagnosis test that requires a short period of time may be executed in a case of unstable traveling such as a case of traveling in a general road with many traveling vehicles.

(Step S402: Transient Error Processing) The malfunction handling unit 23 continues conventional processing without responding. Thus, the malfunction handling unit 23 outputs previously set path information to the control unit 24 as it is.

(Step S403: restoration determination processing)

The malfunction handling unit 23 determines whether conventional processing can be continued after restoration in consideration of the peripheral situation of the moving object which situation is specified in step S2.

In a detailed example, in the first embodiment, the malfunction handling unit 23 determines that the processing can be continued in a case where the road where the moving object 100 travels is a freeway and a case where the type of an area where the moving object 100 travels is a suburb. On the other hand, the malfunction handling unit 23 determines that the processing cannot be continued in a case where the road where the moving object 100 travels is a general road other than a highway or is an entrance/exit of a freeway, and a case where the road where the moving object 100 travels is clogged. Note that the malfunction handling unit 23 may determine that the processing cannot be continued in a case where there is correspondence to everything or nothing. Also, it is possible to determine whether the processing can be continued in consideration of different information included in the peripheral situation.

The malfunction handling unit 23 advances the processing to step S407 in a case where the conventional processing can be continued after restoration, and advances the processing to step S408 in a case where continuance is not possible.

(Step S404: Movement Determination Processing)

The malfunction handling unit 23 determines whether movement to a garage is possible in consideration of the peripheral situation of the moving object which situation is specified in step S2. Here, a malfunctioned system is stopped and only a remaining system is operated. An operation by a multiplex system is kept in a case where there is a plurality of remaining systems. However, a single operation is performed in a case where there is only one remaining system.

In a detailed example, in the first embodiment, the malfunction handling unit 23 determines that movement to a garage is possible in a case where the road where the moving object 100 travels is a freeway or an entrance/exit of the freeway, and a case where the type of an area where the moving object 100 travels is a suburb. On the other hand, the malfunction handling unit 23 determines that movement to a garage is not possible in a case where the road where the moving object 100 travels is a general road other than a highway and a case where the road where the moving object 100 travels is clogged. Note that it is possible to determine that movement to a garage is not possible in a case where there is correspondence to everything or nothing. Also, it is possible to determine whether the processing can be continued in consideration of different information included in the peripheral situation.

The malfunction handling unit 23 advances the processing to step S409 in a case where movement to a garage is possible and advances the processing to step S408 in a case where movement is not possible.

(Step S405: Reboot Determination Processing)

The malfunction handling unit 23 determines whether conventional processing can be continued after reboot in consideration of the peripheral situation of the moving object which situation is specified in step S2.

In a detailed example, in the first embodiment, the malfunction handling unit 23 determines that the processing can be continued in a case where the type of an area where the moving object 100 travels is a suburb. On the other hand, the malfunction handling unit 23 determines that the processing cannot be continued in a case where the road where the moving object 100 travels is a general road other than a highway, is a freeway, or is an entrance/exit of a freeway, and a case where the road where the moving object 100 travels is clogged. Note that the malfunction handling unit 23 may determine that the processing cannot be continued in a case where there is correspondence to everything or nothing. Also, it is possible to determine whether the processing can be continued in consideration of different information included in the peripheral situation.

The malfunction handling unit 23 advances the processing to step S410 in a case where the conventional processing can be continued after the reboot, and advances the processing to step S409 in a case where continuance is not possible.

(Step S406: Manual Driving Transition Processing)

Since restoration from malfunction is not possible, the malfunction handling unit 23 switches control by automated driving to control by manual driving. In this case, the malfunction handling unit 23 ends the processing in FIG. 3.

(Step S407: Processing of Restoring from Malfunction)

The malfunction handling unit 23 executes restoration processing corresponding to occurring malfunction. The restoration processing is to execute a restoration program and the like. Then, the malfunction handling unit 23 outputs previously set path information as it is to the control unit 24.

(Step S408: Road Shoulder Guidance Processing)

With reference to the map information 41, the malfunction handling unit 23 searches for the closest area among areas such as a road shoulder where the moving object 100 can be parked. Then, the malfunction handling unit 23 outputs, to the control unit 24, path information with the searched area as a destination.

(Step S409: Garage Guidance Processing)

The malfunction handling unit 23 searches for the closest garage with reference to the map information 41. The malfunction handling unit 23 outputs, to the control unit 24, path information with the searched garage as a destination.

(Step S410: Reboot Processing)

The malfunction handling unit 23 reboots an instrument in which malfunction occurs. Then, the malfunction handling unit 23 outputs previously set path information as it is to the control unit 24.

Figure 6:
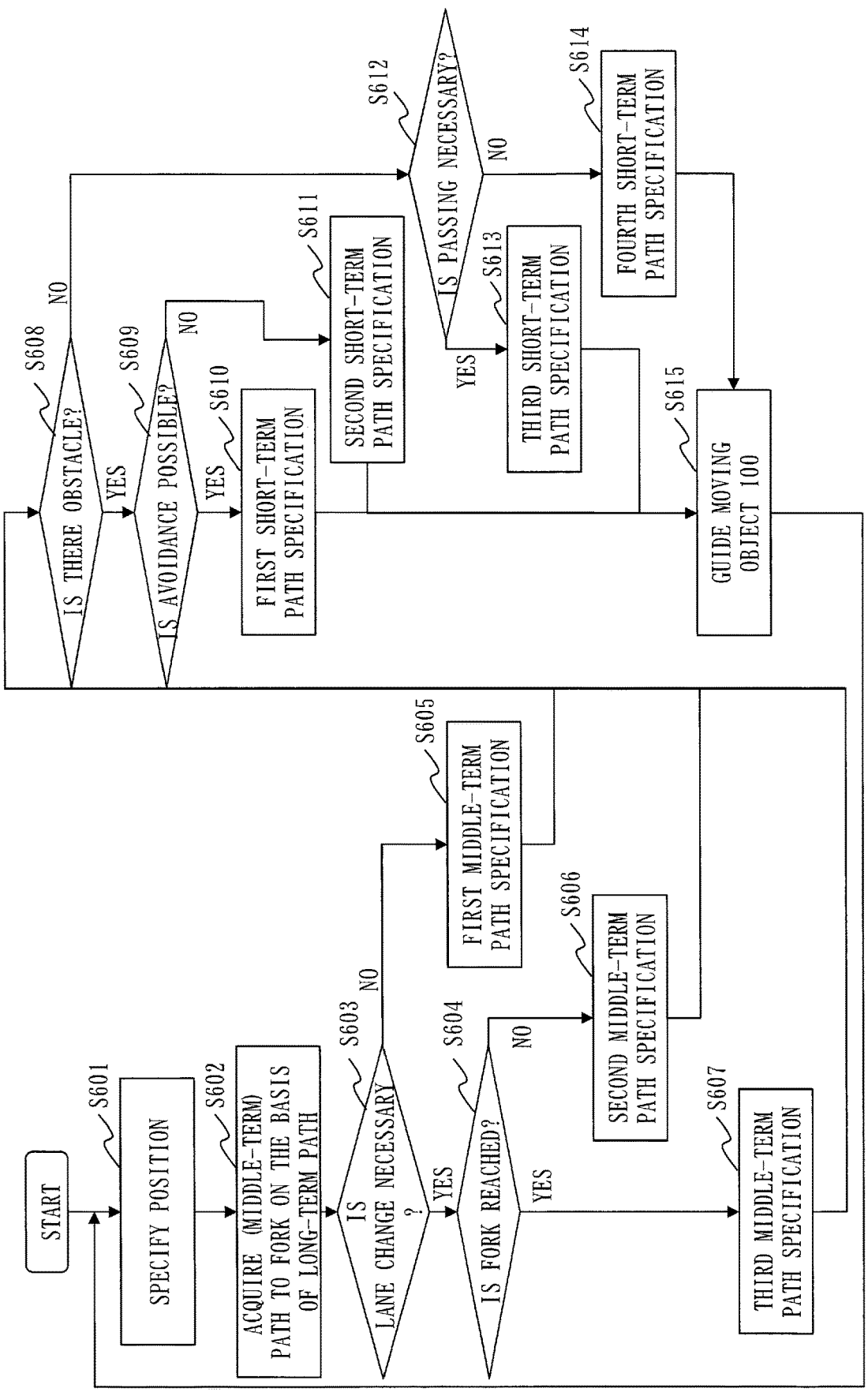
FIG. 6 is a flowchart of moving object controlling processing according to the first embodiment.

The moving object controlling processing (step S6 in FIG. 3) according to the first embodiment will be described with reference to FIG. 6.

Here, a path to a destination which path is indicated by path information is referred to as a long-term path, a partial path such as a path to a next fork in the long-term path is referred to as a middle-term path, and an immediate path, for example, to avoid an obstacle is referred to as a short-term path.

(Step S601: Position Specifying Processing)

The control unit 24 specifies a position of the moving object 100 in the long-term path from the peripheral situation specified in step S2.

(Step S602: Path Acquisition Processing)

The control unit 24 acquires (middle-term) path information from the position specified in step S601 to a next fork in the long-term path.

(Step S603: Lane Change Determination Processing)

The control unit 24 determines whether a lane change is necessary before the next fork in the long-term path from the path information specified in step S602.

The control unit 24 advances the processing to step S604 in a case where a lane change is not necessary and advances the processing to step S605 in a case where a lane change is necessary.

(Step S604: Reaching Fork Determination Processing)

The control unit 24 determines whether the fork is reached.

The control unit 24 advances the processing to step S606 in a case where the fork is not reached, and advances the processing to step S607 in a case where the fork is reached.

(Step S605: First Middle-Term Path Specifying Processing)

The control unit 24 specifies a middle-term path to the fork with a lane change.

(Step S606: Second Middle-Term Path Specifying Processing)

The control unit 24 specifies a middle-term path at the fork such as a right/left turn.

(Step S607: Third Middle-Term Path Specifying Processing)

The control unit 24 specifies a middle-term path in which the moving object 100 travels in a current traveling lane to the fork.

(Step S608: Obstacle Determination Processing) On the basis of the peripheral situation specified in step S2, the control unit 24 determines whether there is an obstacle such as a vehicle or a pedestrian in a traveling direction of the moving object 100 in the middle-term path specified in any of step S605 to step S607.

The control unit 24 advances the processing to step S609 in a case where there is an obstacle and advances the processing to step S612 in a case where there is no obstacle.

(Step S609: Avoidance Path Determination Processing)

The control unit 24 determines whether there is a path that can avoid the obstacle present in the traveling direction of the moving object 100.

The control unit 24 advances the processing to step S610 in a case where there is a path that can avoid the obstacle, and advances the processing to step S611 in a case where there is no path that can avoid the obstacle.

(Step S610: First Short-Term Path Specifying Processing)

The control unit 24 specifies a short-term path to avoid the obstacle.

(Step S611: Second Short-Term Path Specifying Processing)

The control unit 24 specifies a short-term path to prevent a crash into the obstacle, for example, to pull over to a roadside or to stop before the obstacle.

(Step S612: Passing Determination Processing)

The control unit 24 determines whether it is necessary to pass a vehicle traveling in front of the moving object 100.

The control unit 24 advances the processing to step S613 in a case where it is necessary to pass the vehicle and advances the processing to step S614 in a case where it is not necessary to pass the vehicle.

(Step S613: Third Short-Term Path Specifying Processing)

The control unit 24 specifies a short-term path to pass the vehicle.

(Step S614: Fourth Short-Term Path Specifying Processing)

The control unit 24 specifies a short-term path in which the moving object 100 travels in a current traveling lane.

(Step S615: Guidance Processing)

The control unit 24 outputs operation information indicating operation contents of movement of the moving object 100 according to the short-term path specified in any of step S610, step S611, step S613, and step S614 to the control ECU 32 through the input/output interface 13. Then, the control ECU 32 controls instruments such as an accelerator, steering, and a brake according to the output operation information and moves the moving object 100 according to the short-term path.

Effect of First Embodiment

As described above, the moving object controlling device 10 according to the first embodiment determines control contents according to malfunction contents and a peripheral situation of a moving object. Thus, it is possible to realize appropriate control of a case where malfunction occurs in an instrument.

Specifically, the moving object controlling device 10 according to the first embodiment determines a movement path of the moving object 100 according to malfunction contents and a peripheral situation. More specifically, path information to pull over to a road shoulder is generated or path information for a guide to the closest garage is generated according to the malfunction contents and the peripheral situation. Thus, it is possible to reduce occurrence of an accident in a case where malfunction occurs.

Also, according to the malfunction contents and the peripheral situation, the moving object controlling device 10 according to the first embodiment determines control contents of an instrument a malfunction of which is specified. More specifically, restoration processing is performed, or pulling over to a road shoulder is performed without the restoration processing according to the malfunction contents and the peripheral situation. Thus, it is possible to reduce occurrence of an accident in a case where malfunction occurs.

Other Configurations

First Modification Example

A function of each unit of the moving object controlling device 10 is realized by software in the first embodiment. However, a function of each unit of a moving object controlling device 10 may be realized by hardware in the first modification example. A point of this first modification example which point is different from the first embodiment will be described.

Figure 7:
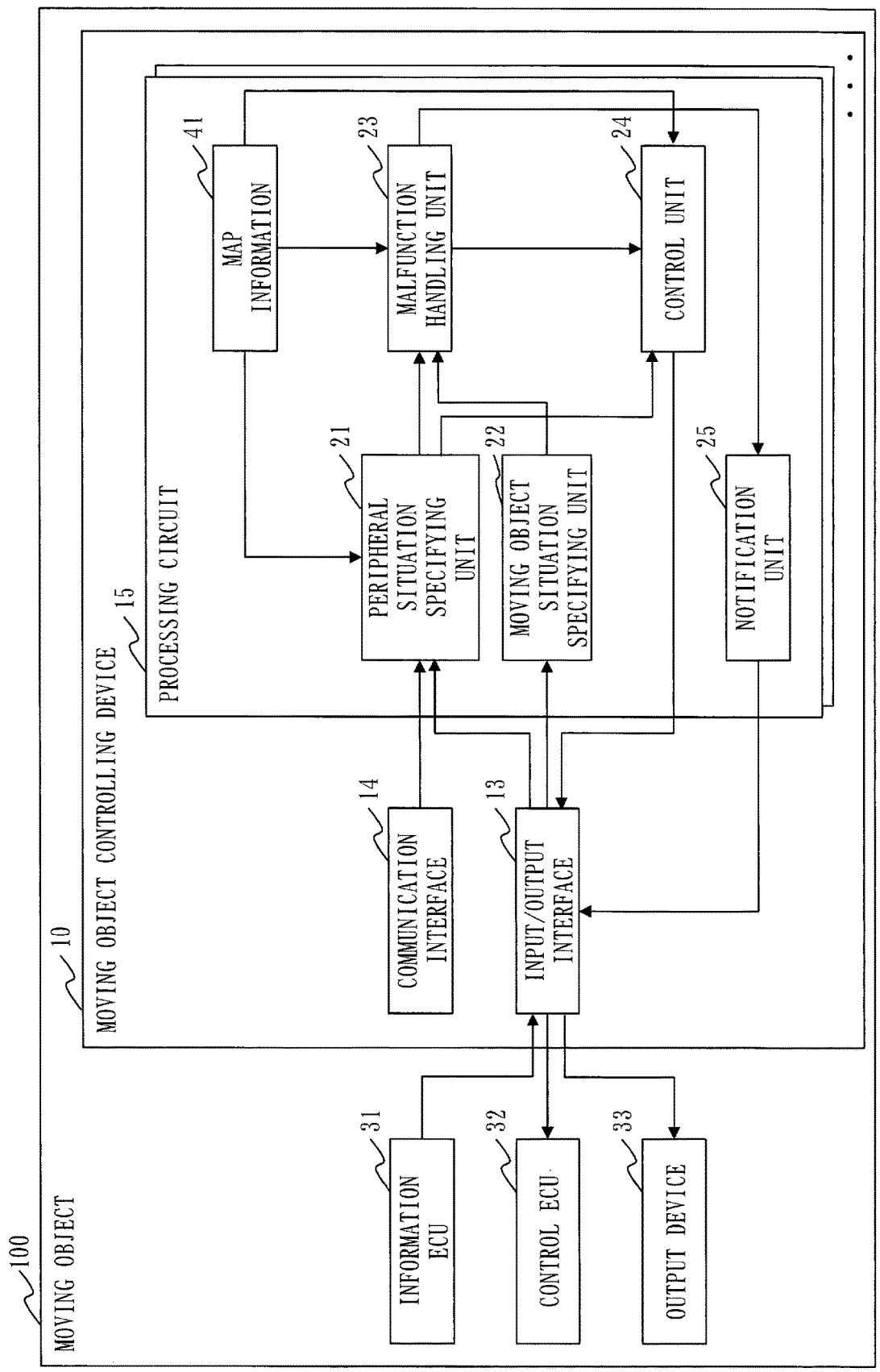
FIG. 7 is a configuration view of a moving object controlling device 10 according to a first modification example.

A configuration of a moving object controlling device 10 according to the first modification example will be described with reference to FIG. 7.

In a case where a function of each unit is realized by hardware, the moving object controlling device 10 includes a plurality of processing circuits 15 instead of a plurality of processors 11 and a storage device 12. The plurality of processing circuits 15 are special electronic circuits to realize a function of each unit of a moving object controlling device 10 and a function of a storage device 12.

As each of the processing circuits 15, a single circuit, a composite circuit, a programmed processor, a parallel-programmed processor, a logic IC, a gate array (GA), an application specific integrated circuit (ASIC), or a field-programmable gate array (FPGA) is assumed.

Second Modification Example

A part of a function may be realized by hardware and the other function may be realized by software in the second modification example. That is, a part of a function of each unit of a moving object controlling device 10 may be realized by hardware and the other function thereof may be realized by software.

A processor 11, a storage device 12, and a processing circuit 15 are collectively referred to as "processing circuitry." That is, a function of each unit is realized by the processing circuitry.

Third Modification Example

In the first embodiment, path information indicating a movement path of the moving object 100 is generated according to malfunction contents and a peripheral situation of the moving object 100 and the moving object 100 is controlled according to the generated path information. As illustrated in FIG. 8, a notification method to a driver may be changed according to malfunction contents and a peripheral situation of a moving object 100 in the third modification example.

For example, a lamp is turned on or a display is made on a display device in a case of notification of a low level. A lamp is blinked or a display is blinked on a display device in a case of notification of a middle level. A warning sound is made in addition to blinking of a lamp or a blinking display on a display device in a case of notification of a high level.

Fourth Modification Example

For example, it is described in the first embodiment that path information is newly generated and control is performed in a case where an instrument malfunctions and that a fallback is performed in a case where a malfunctioned instrument is multiplexed. However, a different instrument related to a malfunctioned instrument may be also controlled in the fourth modification example.

In a detailed example, there is a possibility that malfunction is in a region of a storage device 12, which region is used as a memory region by a processor 11, in a case where the malfunction occurs in the processor 11. Thus, a malfunction handling unit 23 may change a used region of the storage device 12. For example, the malfunction handling unit 23 may change a region used by a program such as software, application software, an operating system (OS), or a driver that realizes each unit.

Fifth Modification Example

In addition, different control such as control of a maximum speed of a moving object 100 may be performed according to malfunction contents and a peripheral situation of the moving object 100.

Second Embodiment

Figure 4:
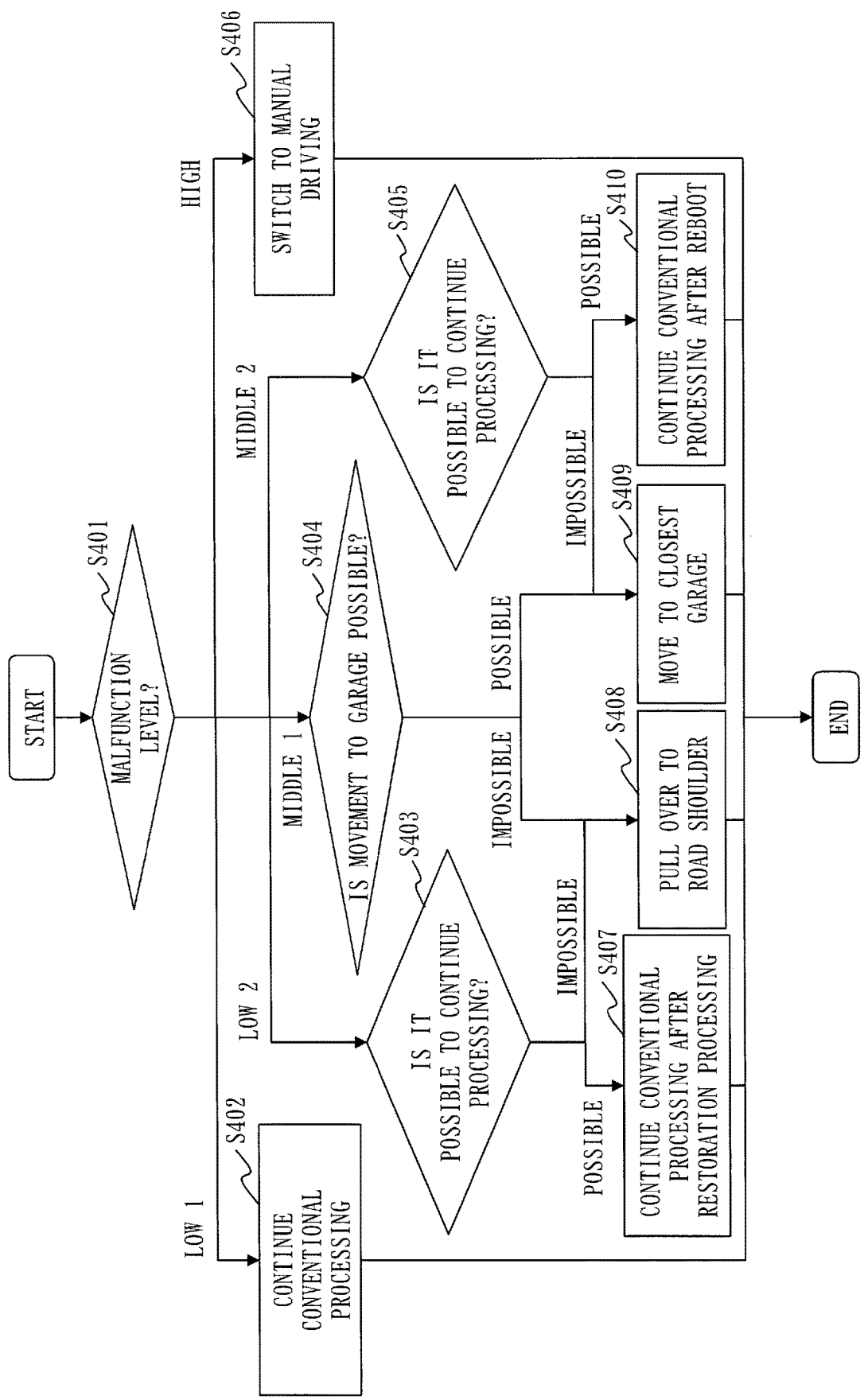
FIG. 4 is a flowchart of malfunction handling processing according to the first embodiment.

In the first embodiment, malfunction handling processing to determine malfunction handling illustrated in a table in FIG. 5 is realized by a flowchart illustrated in FIG. 4. However, in a case of actual implementation, the malfunction handling processing cannot be expressed by a simple table illustrated in FIG. 5 and is expected to be a complicated table. Thus, it is not efficient to express and implement the malfunction handling processing in a flowchart in implementation of software or the like.

A method of efficiently implementing malfunction handling processing will be described in the second embodiment. A point different from the first embodiment will be described in the second embodiment.

Description of Configuration

Figure 9:
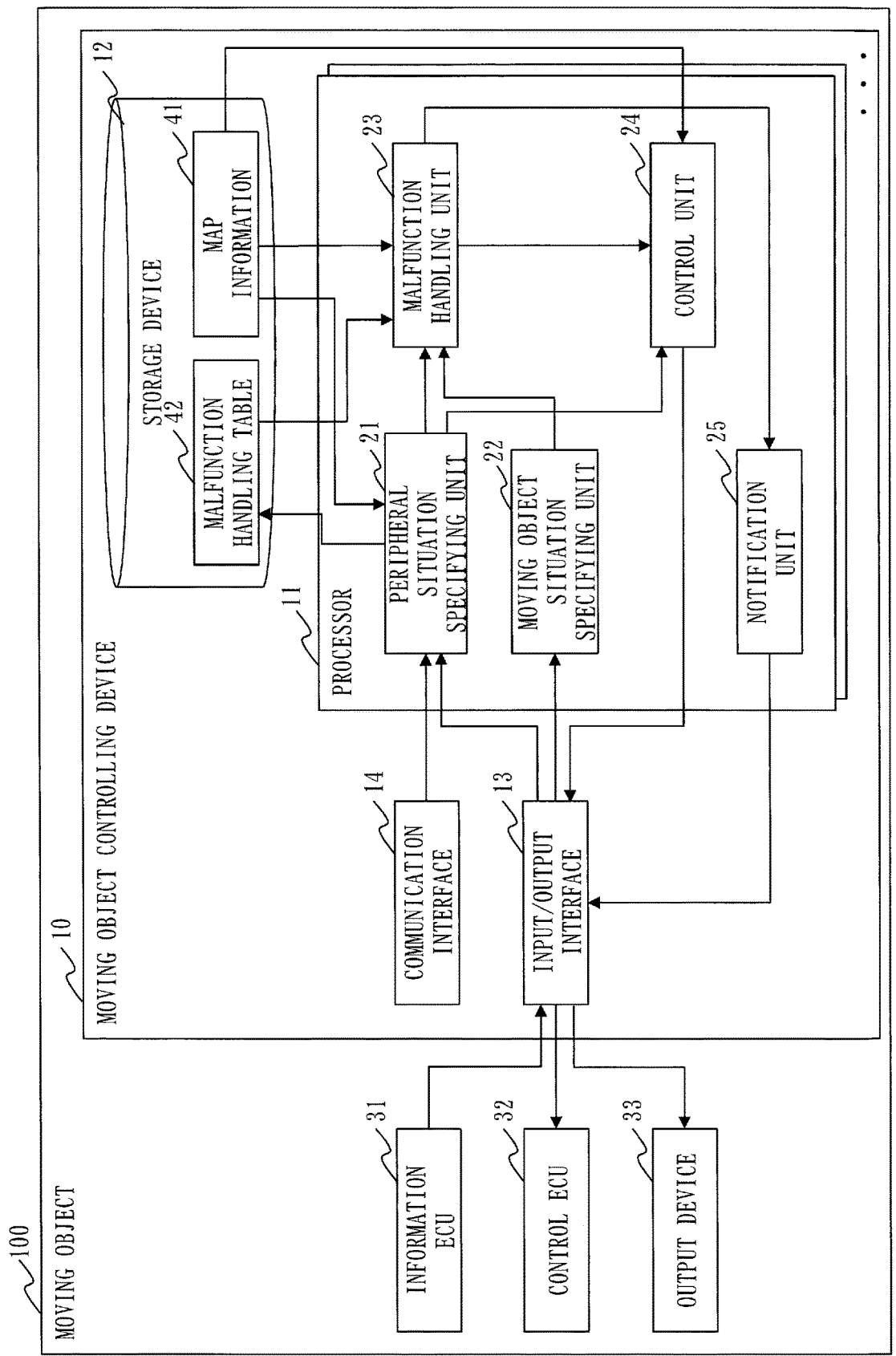
FIG. 9 is a configuration view of a moving object controlling device 10 according to a second embodiment.

A configuration of a moving object controlling device 10 according to the second embodiment will be described with reference to FIG. 9.

The moving object controlling device 10 is different from the moving object controlling device 10 illustrated in FIG. 1 in a point that a malfunction handling table 42 is stored in a storage device 12.

The malfunction handling table 42 is a table which is in a manner illustrated in FIG. 5 and in which information to uniquely determine malfunction handling is stored.

However, in the second embodiment, the malfunction handling table 42 is a more detailed table for a case of actual implementation. That is, in FIG. 5, control contents are stored for each condition with five malfunction levels and a peripheral situation indicating a movement place of a moving object 100 as conditions. On the other hand, the malfunction handling table 42 stores control contents for each of more detailed conditions.

As conditions of the malfunction handling table 42, (1) malfunction contents and (2) a peripheral situation are considered.

The malfunction contents of (1) may be levels such as Low 1, Low 2, Middle 1, Middle 2, and High described in the first embodiment or may be classifications of detailed malfunction contents.

(2) The peripheral situation is a movement place of a moving object 100 which movement place is used in the first embodiment, and a movement environment that influences movement of the moving object 100.

For example, the movement environment indicates presence/absence of a traffic regulation in a road where the moving object 100 travels, a congestion situation of the road where the moving object 100 travels, a road surface state of the road where the moving object 100 travels, weather and presence/absence of occurrence of natural disaster such as an earthquake, volcanic eruption, a tsunami, a tidal wave, a body wind, a forest fire, or a tornado in an area where the moving object 100 travels, and a position on a road surface in which position traveling is possible and which position is specified from a white line, a stop line, a crosswalk, a side strip, a sidewalk curb, and the like on the road where the moving object 100 travels or in a periphery thereof. The road surface state indicates whether a road surface is wet, frozen, bumpy, or inclined in a right/left direction, and a type such as asphalt, gravel, or dirt. Also, the weather indicates whether it is rainy or snowy, a wind speed, presence/absence of fog, and an amount of sunlight. In addition, the movement environment may indicate contents of a traffic sign provided in a road where the moving object 100 travels, presence/absence of an emergency vehicle such as an ambulance, a fire engine, or a police car traveling in a periphery of the moving object 100, or an obstacle such as a pedestrian and a building present in a periphery of the moving object 100.

In the second embodiment, the movement environment is classified into a surrounding peculiar state in which traffic regulation or a situation with a roadway being filled with people occurs due to a traffic accident and an event, an emergency state in which an accident, disaster, and the like occur, a driving difficult state such as a bad road surface and poor visibility, and a normal state in which the surrounding peculiar state, the emergency state, and the driving difficult state do not occur.

In the second embodiment, the malfunction handling table 42 stores control contents for each condition with (1) the malfunction contents and (2) the peripheral situation as conditions. However, when control contents are simply stored for each condition, there are various conditions and the malfunction handling table 42 becomes significantly large table.

Thus, here, as illustrated in FIG. 10, the malfunction handling table 42 includes a plurality of tables that is divided into each of (1) the malfunction contents and the movement environment in (2) the peripheral situation and that stores control contents with the movement place in (2) the peripheral situation as a condition. That is, the malfunction handling table 42 includes tables of "the number of classifications of malfunction contents"×"the number of classifications of movement environments" and control contents are determined for each movement place in each table.

In the second embodiment, the movement environment is classified into four that are presence of the surrounding peculiar state, presence of emergency information, presence of driving difficult information, and the normal state without any of these. Thus, the malfunction handling table 42 includes "the number of classifications of malfunction contents"×4 tables in the second embodiment.

Note that the malfunction handling table 42 may be divided into each movement environment in (2) the peripheral situation and may include a plurality of tables storing control contents with (1) the malfunction contents and the movement place in (2) the peripheral situation as conditions.

Description of Operation

An operation outline of the moving object controlling device 10 according to the second embodiment will be described.

In step S4 in FIG. 3, instead of execution of processing illustrated in FIG. 4, control contents corresponding to a movement place is read from a malfunction handling table 42 corresponding to (1) malfunction contents and a movement environment at a time point of execution of the processing in step S4.

However, in a case where the moving object controlling device 10 is configured by using a microprocessor board, storage capacity of the storage device 12 is small. Thus, it may be difficult for the storage device 12 to store all tables included in the malfunction handling table 42. Thus, the malfunction handling table 42 is stored in an external server in the second embodiment. Then, the moving object controlling device 10 only acquires a table corresponding to a movement environment among tables included in the malfunction handling table 42 stored in the external server and performs storing thereof into the storage device 12.

Overall processing by the moving object controlling device 10 according to the second embodiment will be described with reference to FIG. 3.

Processing in step S2 and processing in step S4 are different from those of the first embodiment.

(Step S2: Peripheral Situation Specifying Processing)

A peripheral situation specifying unit 21 specifies a peripheral situation similarly to the first embodiment. Here, the peripheral situation specifying unit 21 specifies not only a movement place but also a movement environment of a moving object 100 as the peripheral situation.

Also, the peripheral situation specifying unit 21 acquires, through a communication interface 14, a plurality of tables corresponding to a classification of the specified movement environment among the tables included in the malfunction handling table 42 stored in the external server. Then, the peripheral situation specifying unit 21 writes the acquired plurality of tables into the storage device 12. Also, in a case where a table that does not correspond to the movement environment is stored in the storage device 12, the peripheral situation specifying unit 21 deletes the table that does not correspond to the movement environment from the storage device 12.

Note that there may be a case where there is a correspondence to classifications of a plurality of movement environments. In this case, the peripheral situation specifying unit 21 acquires tables of all corresponding classifications and performs writing thereof into the storage device 12.

(Step S4: Malfunction Handling Processing)

The malfunction handling unit 23 specifies a table corresponding to malfunction contents specified in step S3 among the plurality of tables stored in the storage device 12 in step S2. Then, the malfunction handling unit 23 determines control contents with respect to the moving object 100 by reading, from the specified table, a record corresponding to the movement place specified in step S2.

Figure 11:
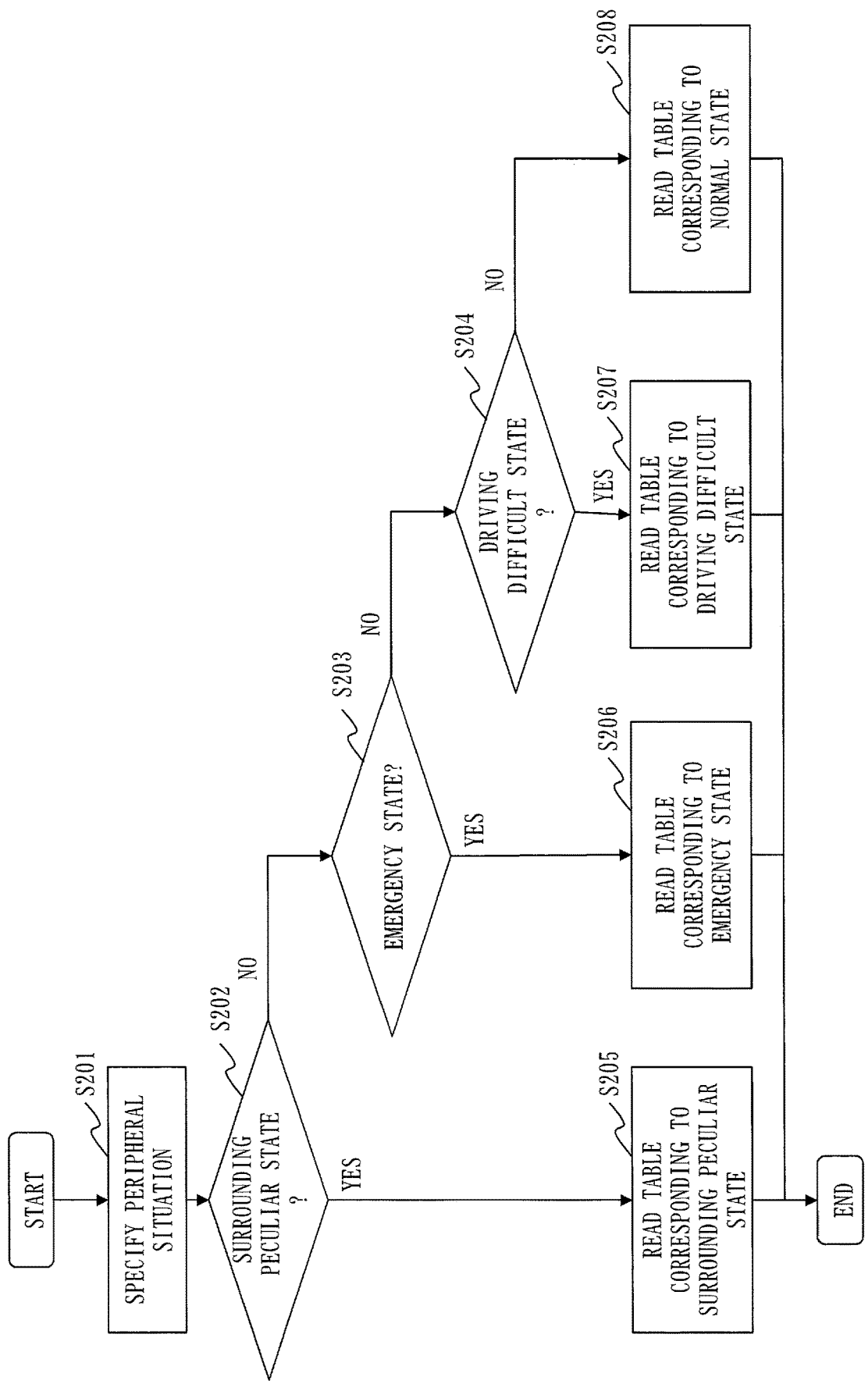
FIG. 11 is a flowchart of peripheral situation specifying processing according to the second embodiment.

The peripheral situation specifying processing (step S2 in FIG. 3) according to the second embodiment will be described with reference to FIG. 11.

It is assumed that the surrounding peculiar state, the emergency state, the driving difficult state, and the normal state are treated preferentially in this order in the second embodiment.

(Step S201: Situation Specifying Processing)

The peripheral situation specifying unit 21 specifies a peripheral situation of the moving object 100.

(Step S202: Surrounding Peculiar State Determination Processing)

The peripheral situation specifying unit 21 determines whether a peripheral situation is the surrounding peculiar state. The peripheral situation specifying unit 21 advances the processing to step S205 in a case of the surrounding peculiar state and advances the processing to step S203 in a case where the peripheral situation is not the surrounding peculiar state.

(Step S203: Emergency State Determination Processing)

The peripheral situation specifying unit 21 determines whether the peripheral situation is the emergency state. The peripheral situation specifying unit 21 advances the processing to step S206 in a case of the emergency state and advances the processing to step S204 in a case where the peripheral situation is not the emergency state.

(Step S204: Driving Difficult State Determination Processing)

The peripheral situation specifying unit 21 determines whether the peripheral situation is the driving difficult state. The peripheral situation specifying unit 21 advances the processing to step S207 in a case of the driving difficult state and advances the processing to step S208 in a case where the peripheral situation is not the driving difficult state.

(Step S205: First Reading Processing)

The peripheral situation specifying unit 21 acquires a plurality of tables corresponding to the surrounding peculiar state from the external server among the tables included in the malfunction handling table 42 and performs writing thereof into the storage device 12.

(Step S206: Second Reading Processing)

The peripheral situation specifying unit 21 acquires a plurality of tables corresponding to the emergency state from the external server among the tables included in the malfunction handling table 42 and performs writing thereof into the storage device 12.

(Step S207: Third Reading Processing)

The peripheral situation specifying unit 21 acquires a plurality of tables corresponding to the driving difficult state from the external server among the tables included in the malfunction handling table 42 and performs writing thereof into the storage device 12.

(Step S208: Fourth Reading Processing)

The peripheral situation specifying unit 21 acquires a plurality of tables corresponding to the normal state from the external server among the tables included in the malfunction handling table 42 and performs writing thereof into the storage device 12.

Effect of Second Embodiment

As described above, the moving object controlling device 10 according to the second embodiment determines control contents of the moving object 100 by using the malfunction handling table 42 which is prepared for each of malfunction contents and movement environments and in which control contents corresponding to a movement place is determined. Thus, it is possible to determine control contents by efficient implementation.

Also, the moving object controlling device 10 according to the second embodiment stores the malfunction handling table 42 in the external server, serially reads necessary information, and performs storing thereof into the storage device 12. Thus, even in a case where storage capacity of the storage device 12 is small compared to a size of the malfunction handling table 42, implementation is possible.

Also, in the moving object controlling device 10 according to the second embodiment, the malfunction handling table 42 includes a plurality of tables that is divided into each of malfunction contents and movement environments and that stores control contents with a movement place as a condition. Then, the moving object controlling device 10 loads a plurality of tables corresponding to a movement environment and specifies a table corresponding to malfunction contents from the loaded tables in a case where malfunction occurs. Then, the moving object controlling device 10 reads control contents corresponding to the movement place from the specified table. Thus, it is possible to immediately determine control contents in a case where malfunction occurs.

Other Configurations

Sixth Modification Example

As illustrated in FIG. 3, processing in step S1 to step S6 is repeatedly executed in the second embodiment. In the sixth modification example, processing in step S2 may be executed as a thread or a task independent from the other processing and a table stored in a storage device 12 may be updated. Then, a peripheral situation may be notified to a malfunction handling unit 23 by a callback function or the like in a case where there is a change in the peripheral situation.

Seventh Modification Example

In the second embodiment, control contents are stored for each condition with malfunction contents and a peripheral situation as conditions. A category of automated driving may be added to a condition in the seventh modification example. The category of automated driving is, for example, a high-speed area category of control in a high-speed area, a middle-speed area category of control in a middle-speed area, a low-speed area category of control in a low-speed area, and a parking category of parking. In addition, a state of a driver may be also included in a condition. The state of a driver is presence/absence of a driver, presence/absence of steering operation by the driver, a gaze of the driver, and presence/absence of a doze of the driver.

Eighth Modification Example

In the first and second embodiments, a vehicle used by a general user is assumed as a moving object 100. A moving object 100 may be a business vehicle in the eighth modification example. Detailed examples of the moving object 100 are a taxi, a transport truck, a mailbox round and pickup/delivery vehicle, and a police vehicle. In such a manner, in a case where the moving object 100 is a business vehicle, a malfunction handling unit 23 may generate path information in which a place such as a business base, a distribution base, or a company-related facility is a destination depending on malfunction contents and a peripheral situation.

Ninth Modification Example

In the first and second embodiments, a vehicle is assumed as a moving object 100. A moving object 100 is not limited to a vehicle and may be a different type such as a ship, a helicopter, or an airplane in the ninth modification example.

In a detailed example, the moving object 100 may be a drone having a load carrying function. Even in a case of a drone, path information is generated and the drone is controlled according to malfunction contents and a peripheral situation similarly to a case of a vehicle. For example, path information corresponding to a peripheral situation indicating a movement place such as a downtown, a residential area, or a suburb and a movement environment such as weather or a wind speed is generated. A test for delivery using a drone is performed and it is considered that a drone is driven automatically from a distribution base to a delivery destination. In a case where malfunction occurs in an automatically-driven drone, the drone is temporarily landed in the closest evacuation point. For example, where to land the drone is controlled from malfunction contents and a peripheral situation.

Tenth Modification Example

In addition, in a case where a moving object 100 is stolen, path information in which the closest police station is a destination may be generated.

REFERENCE SIGNS LIST

10: moving object controlling device, 11: processor, 12: storage device, 13: input/output interface, 14: communication interface, 15: processing circuit, 21: peripheral situation specifying unit, 22: moving object situation specifying unit, 23: malfunction handling unit, 24: control unit, 25: notification unit, 31: information ECU, 32: control ECU, 33: output device, 41: map information, 42: malfunction handling table, 100: moving object.

The invention claimed is:

1. A moving object controlling device comprising:
processing circuitry to:
load only a table corresponding to a movement environment of a moving object from among malfunction handling tables, which are prepared respectively for a plurality of movement environments that influence movement of the moving object and in which movement paths are set, the movement paths being set according to malfunction contents of an instrument mounted in the moving object and a movement place where the moving object moves, and when malfunction of the instrument mounted in the moving object is specified, determine a movement path of the moving object by reading out the movement path corresponding to malfunction contents of the specified malfunction and the movement place from the loaded table; and control at least one of acceleration, steering, and braking of the moving object according to the determined movement path.

2. The moving object controlling device according to claim 1, wherein the processing circuitry determines, according to the malfunction contents, the movement environment, and the movement place, control contents of the instrument the malfunction of which is specified.

3. The moving object controlling device according to claim 1, wherein the processing circuitry determines a notification method of the malfunction to a driver of the moving object according to the malfunction contents, the movement environment, and the movement place.

4. The moving object controlling device according to claim 1, wherein the malfunction handling tables are prepared respectively for the plurality of movement environments and a plurality of types of malfunction contents, and the processing circuitry specifies a table corresponding to the malfunction contents of the specified malfunction among tables that have been loaded, and reads out the movement path corresponding to the movement place from the specified table.

5. The moving object controlling device according to claim 1, wherein the processing circuitry deletes a table not corresponding to the movement environment of the moving object among tables that have been loaded.

6. The moving object controlling device according to claim 1, wherein the plurality of movement environments include:
a surrounding peculiar state in which traffic regulation or a situation with a roadway being filled with people has occurred, an emergency state in which an accident or a disaster has occurred, a driving difficult state in which a bad road surface and poor visibility has occurred, and a normal state in which none of the surrounding peculiar state, the emergency state, and the driving difficult state have occurred, and the processing circuitry loads a table corresponding to a state that matches the movement environment of the moving object among the surrounding peculiar state, the emergency state, the driving difficult state, and the normal state.

7. A moving object controlling method comprising:

loading only a table corresponding to a movement environment of a moving object among malfunction handling tables, which are prepared for a plurality of movement environments that influence movement of the moving object and in which movement paths are set, the movement paths being set according to malfunction contents of an instrument mounted in the moving object and a movement place where the moving object moves, and when malfunction of the instrument mounted in the moving object is specified, determining a movement path of the moving object by reading out the movement path corresponding to malfunction contents of the specified malfunction and the movement place from the loaded table; and controlling at least one of acceleration, steering, and braking of the moving object according to the determined movement path.

8. A non-transitory computer readable medium storing a moving object controlling program causing a computer to execute:

malfunction handling processing of
loading only a table corresponding to a movement environment of a moving object from among malfunction handling tables, which are prepared respectively for a plurality of movement environments that influences movement of the moving object and in which movement paths are set, the movement paths being set according to malfunction contents of an instrument mounted in the moving object and a movement place where the moving object moves, and when malfunction of the instrument mounted in the moving object is specified, determining a movement path of the moving object by reading out the movement path corresponding to malfunction contents of the specified malfunction and the movement place from the loaded table; and control processing of controlling at least one of acceleration, steering, and braking of the moving object according to control contents determined by the malfunction handling processing.

* * * * *